United States Patent [19]
Yamaguchi et al.

[11] Patent Number: 5,671,200
[45] Date of Patent: Sep. 23, 1997

[54] METHOD FOR DETECTING THE MOVEMENT OF A LIGHT BEAM AND OPTICAL INFORMATION REPRODUCTION APPARATUS USING THE SAME

[75] Inventors: Osamu Yamaguchi, Hirakata; Mitsuro Moriya, Ikoma; Hiroyuki Yamaguchi, Hirakata; Yoshihiro Kanda, Osaka; Hiromichi Ishibashi, Ibaraki, all of Japan

[73] Assignee: Matsushita Electric Industrial Co., Ltd., Kadoma, Japan

[21] Appl. No.: 512,190

[22] Filed: Aug. 7, 1995

[30] Foreign Application Priority Data

Aug. 12, 1994 [JP] Japan .................................. 6-190777

[51] Int. Cl.$^6$ .................................................. G11B 7/09
[52] U.S. Cl. ........................... 369/44.28; 369/44.29; 369/44.35
[58] Field of Search ................. 369/43.28, 44.29, 369/44.25, 44.34, 44.35, 44.32, 32, 41, 44.26

[56] References Cited

U.S. PATENT DOCUMENTS

| | | | |
|---|---|---|---|
| 4,106,058 | 8/1978 | Romeas et al. | 358/128 |
| 4,332,022 | 5/1982 | Ceshkovsky et al. | 369/44 |
| 5,311,490 | 5/1994 | Matoba et al. | 369/44.28 |
| 5,335,214 | 8/1994 | Matoba et al. | 369/44.28 |
| 5,444,682 | 8/1995 | Yamada et al. | 369/44.26 |

FOREIGN PATENT DOCUMENTS

| | | |
|---|---|---|
| 58-62837 | 4/1983 | Japan . |
| 62-36286 | 8/1987 | Japan . |

*Primary Examiner*—Thang V. Tran
*Attorney, Agent, or Firm*—Renner, Otto, Boisselle, Sklar

[57] ABSTRACT

An optical information reproduction apparatus for reproducing information from a disc having a plurality of tracks storing the information in the form of pits includes a radiation device for radiating a light beam toward the disc to form a light spot on the disc; a moving device for moving the radiation device to move the light spot in a direction crossing the plurality of tracks in a radial direction of the disc; a photodetector having a detecting plane for receiving the light beam reflected by the disc, the detecting plane being divided into four detection areas at least in a direction parallel to a tangent of the tracks and in a direction perpendicular to the tangent of the tracks, the four detection areas generating light intensity signals corresponding to the intensities of the light beam which is received; a positional offset detector for detecting a positional offset of the light spot with respect to one of the tracks based on the light intensity signals generated by the photodetector and outputting the detection result as a positional offset signal; a signal processor for performing processing of the light intensity signals including logic operation to obtain an operation signal; and a direction detector for detecting a direction in which the light spot moves with respect to a target track based on the positional offset signal and the operation signal during the movement of the light spot toward the target track.

16 Claims, 14 Drawing Sheets

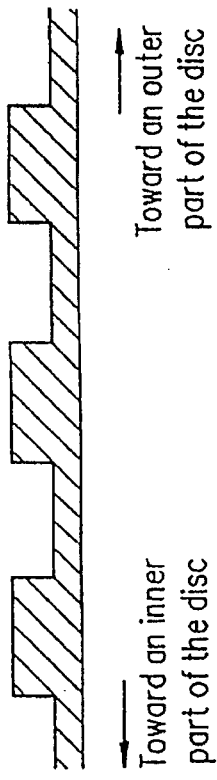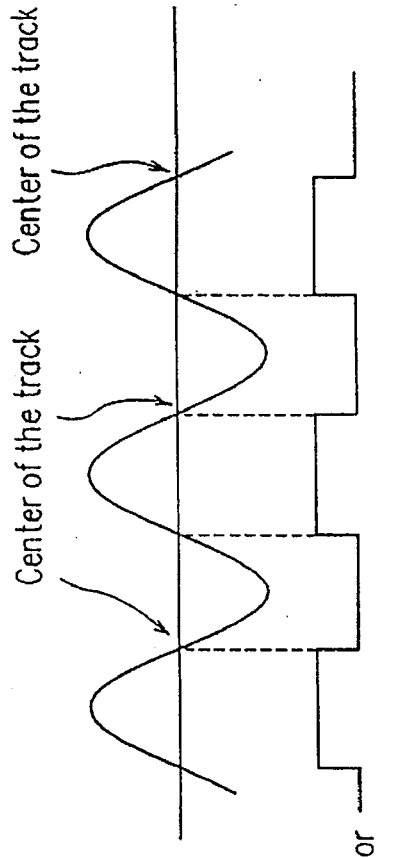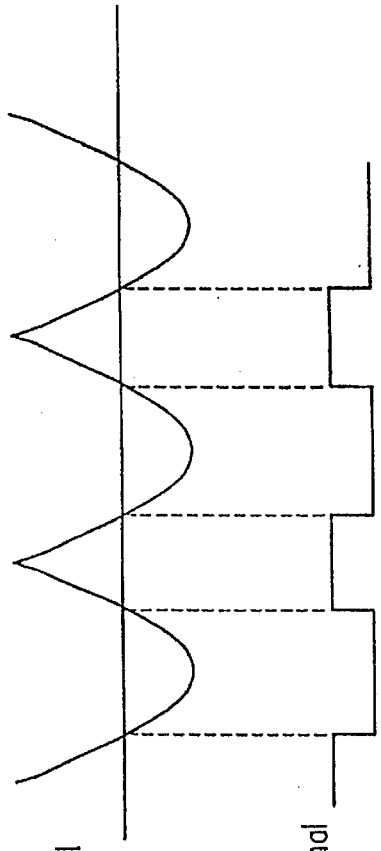
FIG. 3(a) Cross section of the track
FIG. 3(b) Tracking error signal
FIG. 3(c) Signal obtained by level-slicing the tracking error signal
FIG. 3(d) Off-track signal
FIG. 3(e) Signal obtained by level-slicing the off-track signal

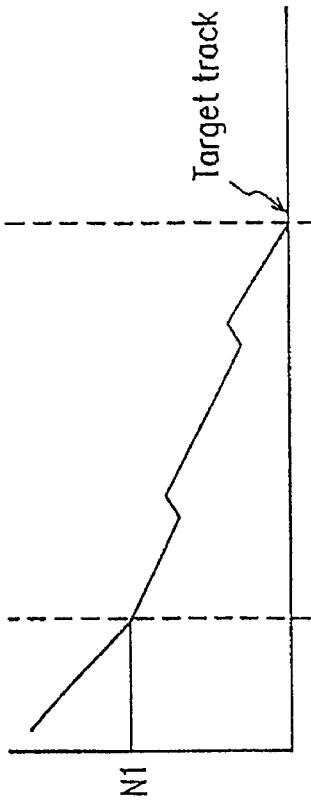
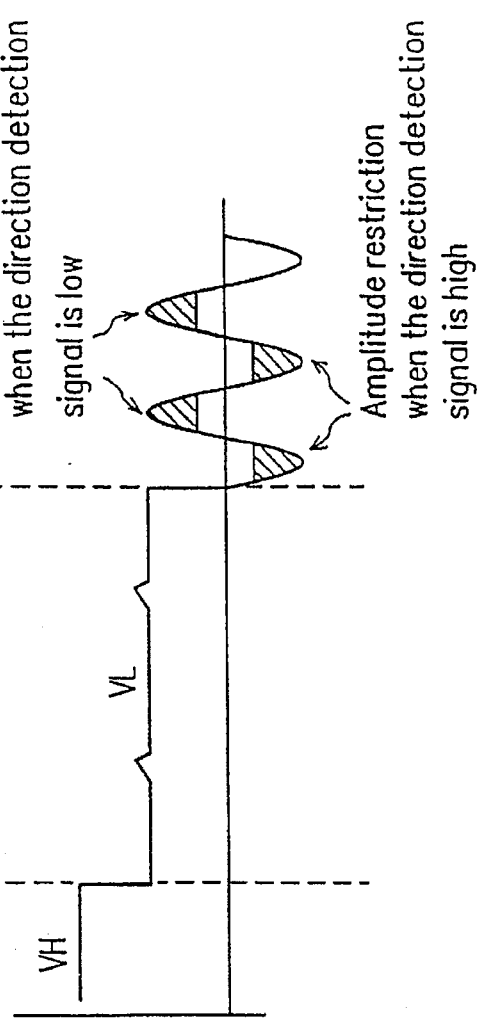
FIG. 5 (a) Direction detection signal
FIG. 5 (b) Number of the tracks to the target track
FIG. 5 (c) Output from the moving velocity controller Input A to the exclusive OR circuit
Input B to the exclusive OR circuit
Output from the exclusive OR circuit Input A to the exclusive OR circuit
Input B to the exclusive OR circuit
Output from the exclusive OR circuit

METHOD FOR DETECTING THE MOVEMENT OF A LIGHT BEAM AND OPTICAL INFORMATION REPRODUCTION APPARATUS USING THE SAME

BACKGROUND OF THE INVENTION

1. Field of the Invention

The present invention relates to a method for detecting movement of a light beam in an apparatus for reproducing information by radiating a light beam focused on an optical disc, and to an optical information reproduction apparatus for reproducing information recorded in an optical disc using such a method.

2. Description of the Related Art

In a known apparatus for reproducing information recorded in an optical disc, a light beam emitted by a light source such as a semiconductor laser is converged by a convergent lens onto an information carrier such as an optical disc (hereinafter, referred to simply as a "disc") having pits, and the signals are read based on the light reflected by the disc.

In such an optical information reproduction apparatus, focus control and tracking control are performed. Focus control is performed to constantly converge the light beam in a prescribed convergence state on a reflective film on the disc, and the tracking control is performed to constantly position the light beam on a target track of the disc. Further, track search control for track retrieval is performed to realize random access to the target track on the disc. In detail, the track search control is performed by stopping the tracking control, then moving the light beam in the radial direction of the disc toward a target track, and restarting the tracking control when the light beam reaches the target track. Track search is described in, for example, the U.S. Pat. Nos. 4,106,058 and 4,332,022.

The position of the light beam spot during search of the target track is obtained by counting the number of the signals crossing the tracks transversely, namely, in the radial direction of the disc from the start of the track search. However, in the case when the moving velocity of the light beam spot is low, for example, when the search starts and when the light beam spot becomes close to the target track, the light beam spot often moves in an opposite direction by the eccentricity of the disc, the fluctuation of the tracking actuator, or the like. In such a case, there arises an error between the position of the light beam spot and the number of the signals crossing the tracks transversely obtained by the counting. In order to solve this problem, the direction in which the light beam spot is moving is detected, so that the number of the signals crossing the tracks transversely is reduced while the light beam spot runs in the opposite direction.

The bandwidth which is controllable by the tracking control is usually several kilohertz, and thus the capability of the tracking pull with respect to the light beam spot is limited. The velocity of the light beam spot going into the target track is controlled to be appropriate to the tracking pull of the light beam spot performed by the tracking control. However, the light beam spot is sometimes excessively fast in going into the target track due to the eccentricity of the disc, the fluctuation of the tracking actuator or the like. In such a case, the light beam spot moves excessively to be pulled to another track, which requires extra time to pull the light beam spot back to the target track. In order to minimize the distance by which the light beam spot runs excessively during the tracking pull, the direction in which the light beam spot crosses the tracks transversely during the tracking pull is detected to reduce the relative moving velocity of the light beam spot with respect to the target track.

A representative system for controlling the rotation of the disc is a constant linear velocity system (hereinafter, referred to as "a CLV system"). The CLV system, which realizes constant recording density of information on the disc regardless of where the information is recorded in the disc, allows high density recording of information in the disc. However, when the light beam spot moves, for example, during reproduction of the information or during the track search, the rotation rate of the disc needs to be changed in accordance with the movement of the light beam spot in order to maintain the linear velocity constant.

With reference to FIG. 13, a conventional optical information reproduction apparatus 200 will be described. The optical information reproduction apparatus 200 includes a disc 1 and a motor 2 for rotating the disc 1. The rotation rate of the motor 2 is controlled by a rotation rate controller 40. An optical head 19 is movable by a moving device 17 in a radial direction of the disc 1. A light beam emitted by a light source 20 is converged by lenses 201 to form a small light beam spot S on the disc 1. The light beam reflected by the disc 1 is radiated on a four-divided photodetector 3 through one of the lenses 201 and a reflecting plate 24. Signals output from four output terminals 3001, 3002, 3003 and 3004 of the four-divided photodetector 3 are input to four input terminals 4001, 4002, 4003 and 4004 of a tracking error signal detector 4. The tracking error signal detector 4 outputs a signal from an output terminal 4005 thereof in correspondence with a distance by which the light beam spot S is offset from the center of the target track. The signal output from the output terminal 4005 is sent to an input terminal 51 of a phase compensator 5. The phase compensator 5 is provided in order to compensate the phase of the tracking control system to stabilize the control loop. The signal from an output terminal 52 of the phase compensator 5 is sent to an input terminal 61 of an amplitude restriction circuit 6, and the signal from an output terminal 62 of the amplitude restriction circuit 6 is sent to an input terminal 141 of a switching device 14. The switching device 14 has another input terminal 142. In the state where an output terminal 143 of the switching device 14 is connected to the input terminal 141, the output from the tracking error signal detector 4 is sent to the moving device 17 via the phase compensator 5, the amplitude restriction circuit 6, and the switching device 14. Thus, tracking control of the light beam spot S is performed so that the light beam spot S is on the target track. During normal tracking control, the amplitude restriction circuit 6 sends the signal input to the input terminal 61 to the output terminal 62 without processing the signal.

The target track is retrieved in the following manner.

The four signals from the output terminals 3001, 3002, 3003 and 3004 of the four-divided photodetector 3 are input to input terminals 161, 162, 163 and 164 of an RF signal detector 16. An RF signal obtained by synthesizing the four signals is output from an output terminal 165 of the RF signal detector 16. The RF signal is input to an input terminal 361 of an envelope detector 36 and then sent via an output terminal 362 of the envelope detector 36 and input and output terminals 91 and 92 of a second level slicer 9 to be input to an input terminal 102 of a direction detector 10. The tracking error signal from the tracking error signal detector 4 is input to another input terminal 101 of the direction detector 10 via input and output terminals 81 and 82 of a first level slicer 8. The direction detector 10 is provided for detecting in which direction the light beam spot S moves with respect to the target track on the disc 1.

The signal output from an output terminal 103 of the direction detector 10 is sent to an up/down switching signal input terminal 112 of a counter 11. The counter 11 has a signal sent from the output terminal 82 of the first level slicer 8 through an input terminal 111, the signal being obtained by level-slicing the tracking error signal from the tracking error signal detector 4.

When an address of the target track is assigned, the difference between the address of the track where the light beam spot S is located and the address of the target track is counted. The value representing the difference is preset in the counter 11, and simultaneously a search start signal is input to a switching timing generator 15. The switching timing generator 15 connects the input terminal 142 and the output terminal 143 of the switching device 14. A signal from an output terminal 132 of a moving velocity controller 13 is sent to the input terminal 142 of the switching device 14. Thus, the tracking control is stopped and the output from the moving velocity controller 13 is sent to the moving device 17. The counter 11 counts the signal obtained by level-slicing the direction signal from the direction detector 10 by the first level slicer 8 and outputs a value corresponding to the distance between the track where the light beam spot S is located and the target track. A reference velocity signal generator 12 provides the moving velocity controller 13 with a reference velocity signal corresponding to the value obtained by the counter 11, namely, a reference velocity signal corresponding to the above-mentioned distance to the target track. A velocity measurement circuit 41 measures the relative velocity of the light beam spot S with respect to the target track based on a change in the value obtained by the counter 11, and sends the velocity signal to the moving velocity controller 13. The moving velocity controller 13 calculates the difference between the reference velocity signal sent from the reference velocity signal generator 12 and the velocity signal sent from the velocity measurement circuit 41, and the signal corresponding to such a difference is used to drive the moving device 17. The optical head 19 is moved toward the target track while the moving velocity thereof is controlled to be equal to the reference velocity.

The switching timing generator 15 detects when the light beam spot S has reached the target track based on the value sent from the counter 11 and instructs the switching device 14 to connect the input terminal 141 and the output terminal 143. Thus, the tracking pull of the light beam spot S is performed. In the case where the velocity of the light beam spot S at the start of the tracking pull exceeds the maximum velocity at which the light beam spot S can be pulled properly to the target track, the light beam spot S moves beyond the target track to be pulled to a different track. In order to minimize the distance by which the light beam spot S moves excessively, the switching timing generator 15 sends a signal to the amplitude restriction circuit 6 for a certain length of time after the tracking pull of the light beam spot S starts, for instance, for approximately 1 msec. As is shown in waveform (c) of FIG. 5, the amplitude restriction circuit 6 restricts one of a positive amplitude and a negative amplitude of the signal to be sent to the moving device 17 in accordance with the signal from the direction detector 10. Accordingly, when the light beam spot S fails to be pulled to the target track, the signal from the amplitude restriction circuit 6 acts in such a direction as to counteract the movement of the optical head 19 and thus stops the optical head 19. Thus, the extra movement of the optical head 19 is minimized.

Returning to FIG. 13, the rotation of the motor 2 is controlled in the following manner.

The rotation rate controller 40 includes a fifth level slicer 22, a minimum period detector 38, and a D/A converter 39. The RF signal is converted into a signal obtained by the level slicer 22. As is shown in FIG. 14, the time period from a first rise to a second rise of the signal obtained by level-slicing the RF signal is counted by the minimum period detector 38 using a clock having a higher frequency than the minimum period of the RF signal, and then a minimum value counted during a certain period of time (from N001 to N100 in the case of FIG. 14) is obtained. Thus, a value corresponding to the minimum cycle of the RF signal is obtained, and the resultant digital value is converted into an analog signal by the D/A converter 39 to control the motor 2. Since the rotation of the motor 2 is controlled so that the minimum cycle of the RF signal is a prescribed value in this manner, the disc 1 is rotated so that the rotation rate thereof is constant at a position thereof irradiated by the light beam spot S, namely, so that the rotation rate is higher in an inner part of the disc 1 than in an outer part of the disc 1.

Such a conventional system for detecting the direction of the movement of the light beam spot S using a tracking error signal and an envelope detection signal has the following problems. In the case when the track pitch of the disc 1 is narrowed for higher recording density, the amplitude of the envelope detection signal is reduced due to crosstalk with an adjacent track. Accordingly, the detection of the direction in which the light beam spot S moves becomes more difficult, and thus the precision in moving the light beam spot S for the track search is lowered. This causes the problems such as extension of the search time and unstable tracking pull of the light beam spot S.

SUMMARY OF THE INVENTION

In one aspect of the present invention, an optical information reproduction apparatus for reproducing information from a disc having a plurality of tracks storing the information in the form of pits includes a radiation device for radiating a light beam toward the disc to form a light spot on the disc; a moving device for moving the radiation device to move the light spot in a direction crossing the plurality of tracks in a radial direction of the disc; a photodetector having a detecting plane for receiving the light beam reflected by the disc, the detecting plane being divided into four detection areas at least in a direction parallel to a tangent of the tracks and in a direction perpendicular to the tangent of the tracks, the four detection areas generating light intensity signals corresponding to the intensities of the light beam which is received; a positional offset detector for detecting a positional offset of the light spot on the disc with respect to one of the tracks based on the light intensity signals generated by the photodetector and outputting the detection result as a positional offset signal; a signal processor for performing processing of the light intensity signals including logic operation to obtain an operation signal; and a direction detector for detecting a direction in which the light spot moves with respect to a target track based on the positional offset signal and the operation signal during the movement of the light spot toward the target track.

In another aspect of the present invention, an optical information reproduction apparatus for reproducing information from a disc having a plurality of tracks storing the information in the form of pits includes a radiation device for radiating a light beam toward the disc to form a light spot on the disc; a moving device for moving the radiation device to move the light spot in a direction crossing the plurality of tracks in a radial direction of the disc; a photodetector having a detecting plane for receiving the light beam reflected by the disc, the detecting plane being divided into two detection areas in a direction parallel to a tangent of the tracks, the two detection areas generating light intensity signals corresponding to the intensities of the light beam which is received; a positional offset detector for detecting a positional offset of the light spot with respect to one of the tracks based on the light intensity signals generated by the photodetector and outputting the detection result as a positional offset signal; a signal processor for performing processing of the light intensity signals including logic operation to obtain an operation signal; and a direction detector for detecting a direction in which the light spot moves with respect to a target track based on the positional offset signal and the operation signal during the movement of the light spot toward the target track.

In still another aspect of the present invention, a method for moving a light spot formed by radiating a light beam toward a disc having a plurality of tracks having information in the form of pits includes the steps of receiving the light beam reflected by the disc by photodetector having a plurality of detection areas to generate light intensity signals corresponding to the intensities of the light beam received by the respective detection areas; detecting a positional offset of the light spot with respect to one of the tracks based on the signals and outputting the detection result as a positional offset signal; performing processing of the light intensity signals including logic operation for obtaining an exclusive OR and outputting the operation result as an operation signal; and performing waveform shaping of the positional offset signal and the operation signal to detect a direction in which the light spot moves based on a phase difference between the positional offset signal with the waveform thereof shaped and the operation signal with the waveform thereof shaped, and thus generating a direction signal indicating the detected direction.

Thus, the invention described herein makes possible the advantage of providing a method for stably detecting the movement of a light beam in a disc storing information at a high recording density and an apparatus for realizing a high-speed track search and stable tracking pull in tracking control.

This and other advantages of the present invention will become apparent to those skilled in the art upon reading and understanding the following detailed description with reference to the accompanying figures.

BRIEF DESCRIPTION OF THE DRAWINGS

FIG. 3(a) is a cross section of a track and FIGS. 3(b)–3(e) are illustrations of waveforms of signals used in the optical information apparatus shown in FIG. 1;

FIG. 5(a)–5(c) represent timing chart illustrating the operation of a moving device in the optical information reproduction apparatus shown in FIG. 1;

DESCRIPTION OF THE PREFERRED EMBODIMENTS

Figure 1:
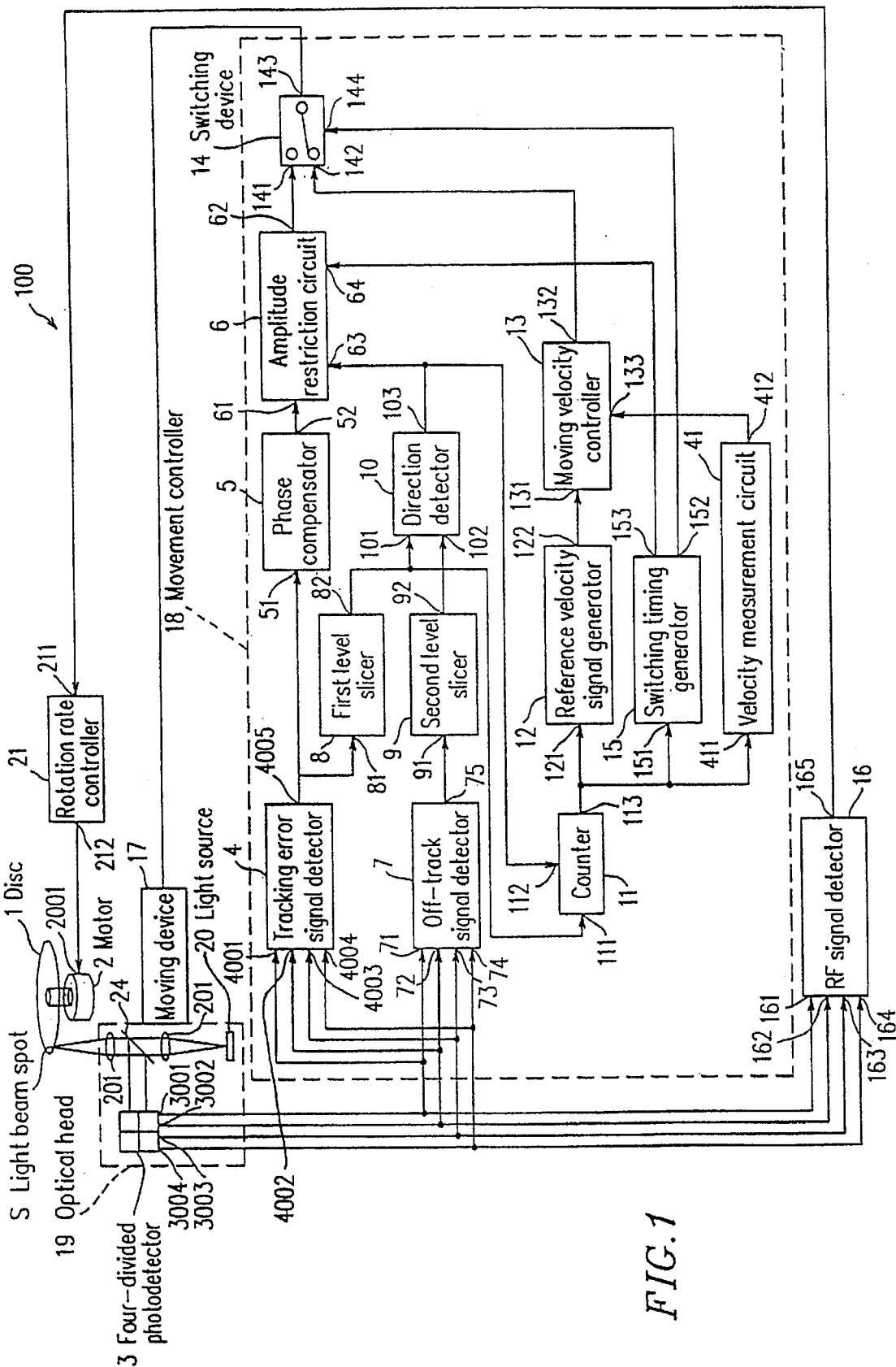
FIG. 1 is a block diagram of an optical information reproduction apparatus in an example according to the present invention.
Figure 13:
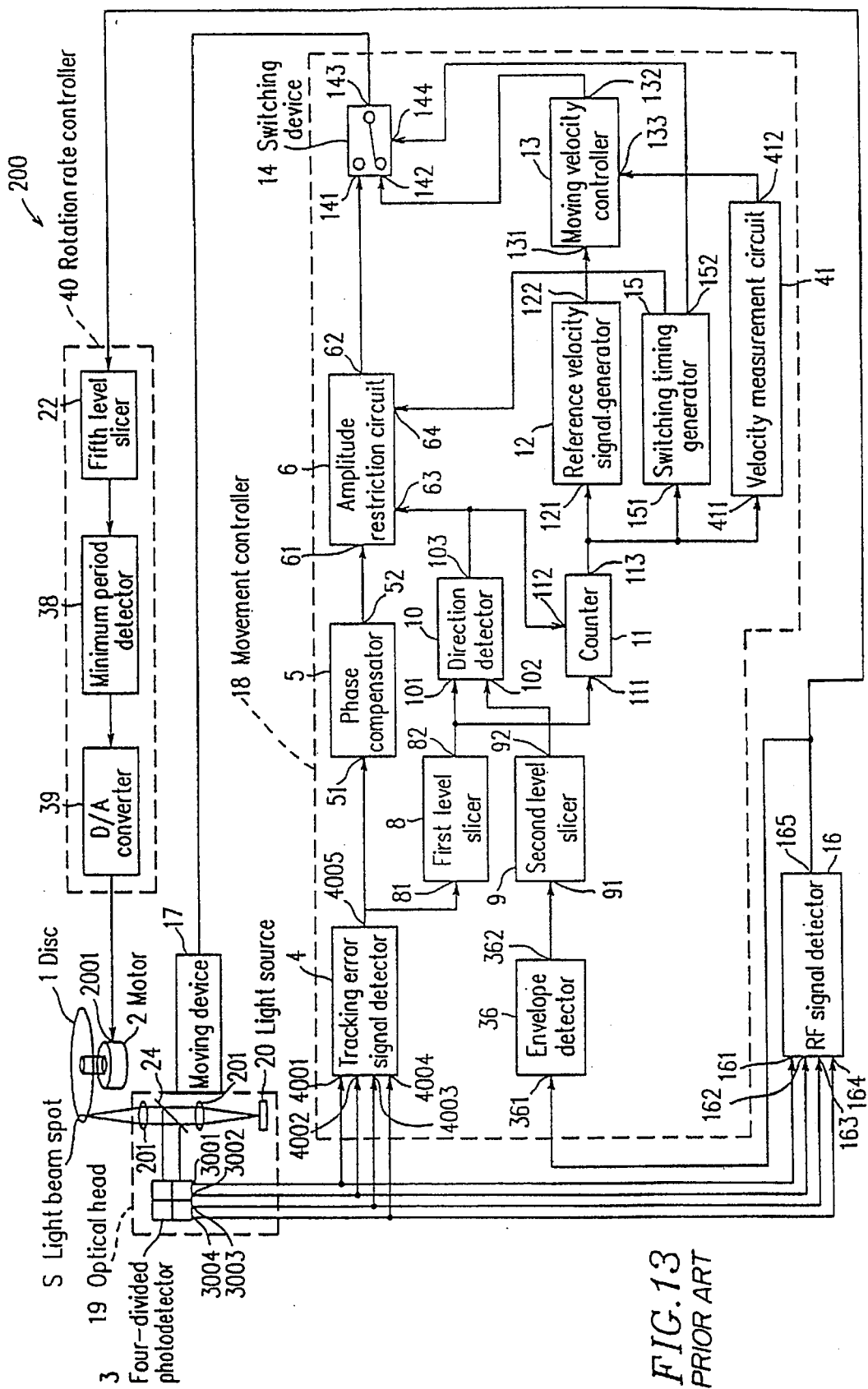
FIG. 13 is a block diagram of a conventional optical information reproduction apparatus.
Figure 14:
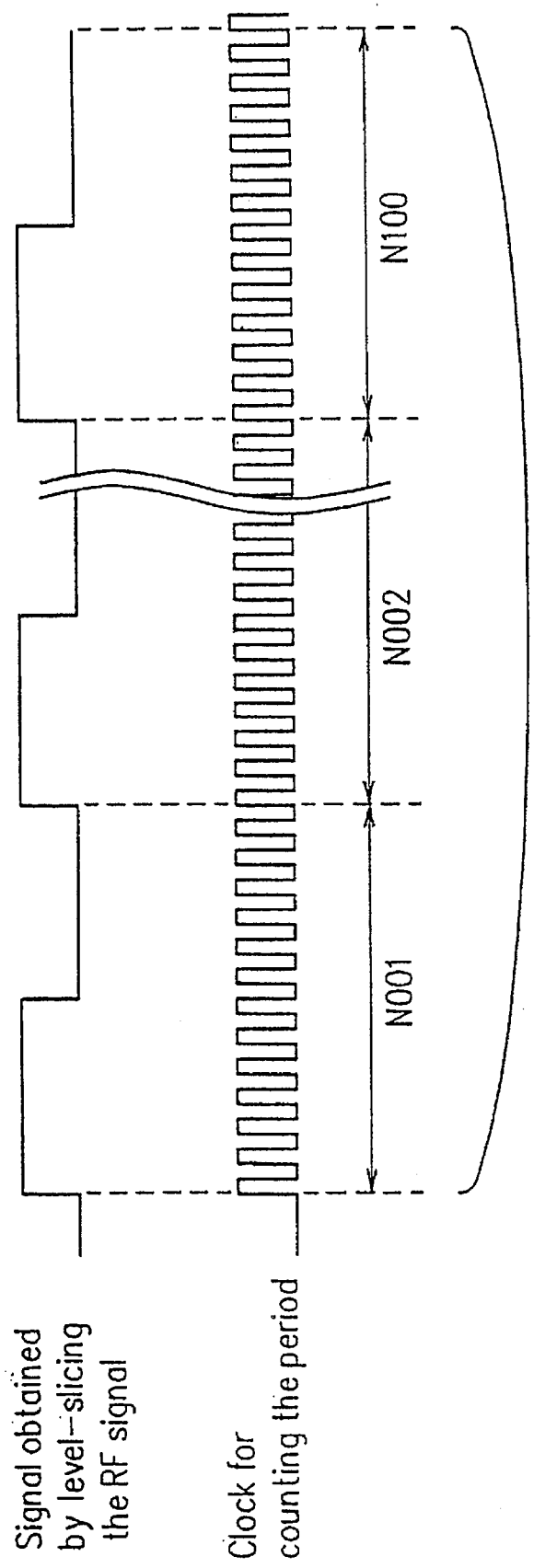
FIG. 14 is a timing chart of a minimum period detector of the conventional optical information reproduction apparatus.

An optical information reproduction apparatus 100 in an example according to the present invention will be described with reference to FIG. 1. FIG. 1 is a block diagram of the optical information reproduction apparatus 100. Identical elements as those in FIG. 13 bear the identical reference numerals therewith and detailed explanation thereof will be omitted.

Four outputs from the four-divided photodetector 3 are synthesized by the RF signal detector 16, and the resultant signal is input into a rotation controller 21. As described later, the rotation controller 21 controls the motor 2 so as to maintain the rotation rate of the disc 1 constant at a position irradiated by the light beam spot S.

Figure 2:
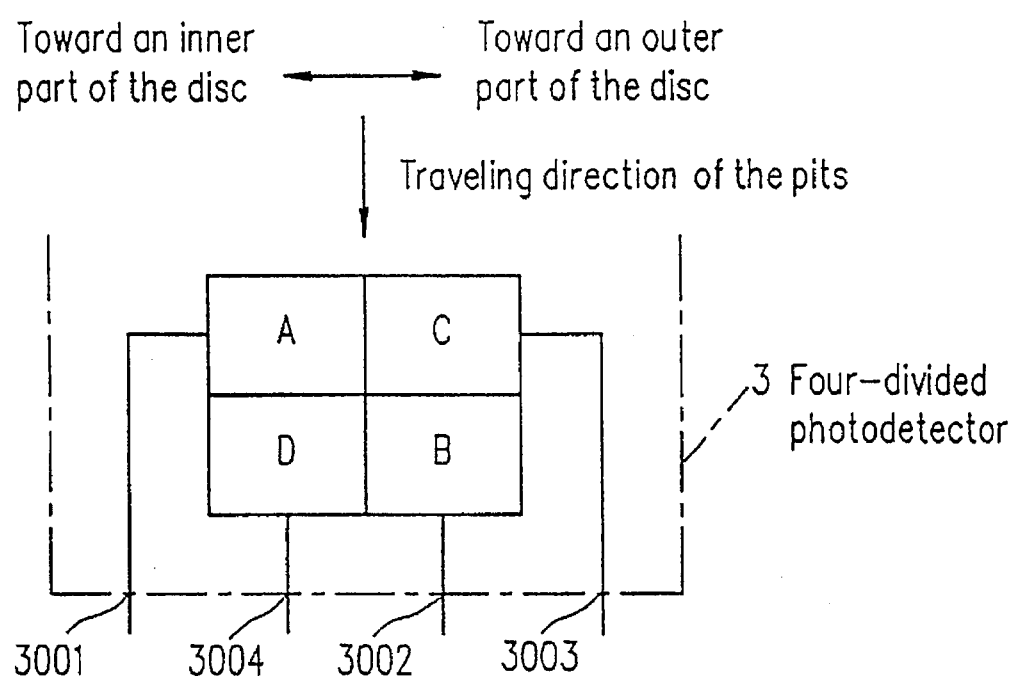
FIG. 2 is a schematic view of a four-divided photodetector in the optical information reproduction apparatus shown in FIG. 1.

As is shown in FIG. 2, the four-divided photodetector 3 has a detecting plane which is divided into four detecting areas and outputs from the respective output terminals 3001, 3002, 3003 and 3004 are respectively sent to the input terminals 4001, 4002, 4003 and 4004 of the tracking error signal detector 4. Thus, a signal corresponding to a distance by which the light beam spot S is offset from the center of the target track, namely, a tracking error signal is output from the output terminal 4005. The tracking error signal is then sent to the moving device 17 via the phase compensator 5, the amplitude restriction circuit 6, and the switching device 14. Thus, the tracking control of the light beam spot S is performed so as to locate the light beam spot S on the target track.

The signals from the output terminals 3001, 3002, 3003 and 3004 are respectively sent to four input terminals 71, 72, 73 and 74 of an off-track signal detector 7. The off-track signal detector 7 outputs an off-track signal from an output terminal 75 thereof. The level of the signal from the detector 7 becomes minimum when the light beam spot S is on the target track and becomes maximum when the light beam spot S is at a median position between the centers of two adjacent tracks. The signal from the detector 7 is sent to the input terminal 102 of the direction detector 10 via the second level slicer 9. The waveform of the tracking error signal from the tracking error signal detector 4 is shaped into a signal having a high level and a low level by the first level slicer 8, and the resultant signal is input to the input terminal 101 of the direction detector 10. The direction detector 10 detects in which direction the light beam spot S moves with respect to the target track on the disc 1 and sends the detection result as a direction signal to the up/down switching signal input terminal 112 of the counter 11. The signal from the output terminal 82 of the first level slicer 8 is sent to the input terminal 111 of the counter 11.

When an address of the target track is assigned, the difference between the address of the track where the light beam spot S is located and the address of the target track is calculated. The value representing the difference is preset in the counter 11, and simultaneously a search start signal is input to the switching timing generator 15. The switching timing generator 15 connects the input terminal 142 and the output terminal 143 of the switching device 14. The signal from the output terminal 132 of the moving velocity controller 13 is sent to the input terminal 142 of the switching device 14. When the search start signal is input to the switching timing generator 15, the tracking control is stopped and the output from the moving velocity controller 13 is sent to the moving device 17 through the switching device 14. The counter 11 counts the signal obtained by the first level slicer 8 in consideration of the direction signal from the direction detector 10 and outputs a value obtained by the counting corresponding to the distance between the track where the light beam spot S is located and the target track. The reference velocity signal generator 12 sends a reference velocity signal in correspondence with the value obtained by the counter 11, namely, a reference velocity signal, to the moving device 17 via the moving velocity controller 13. Thus, the optical head 19 starts moving toward the target track when the search starts.

The velocity measurement circuit 41 measures the relative velocity of the light beam spot S with respect to the target track based on a change in the value obtained by the counter 11, and sends the measurement result as a velocity signal to the moving velocity controller 13. The moving velocity controller 13 calculates the difference between the reference velocity signal sent from the reference velocity signal generator 12 and the velocity signal sent from the velocity measurement circuit 41. The signal corresponding to such a difference is used to drive the moving device 17. Accordingly, the optical head 19 is moved toward the target track while the moving velocity thereof is controlled to be equal to the reference velocity.

The switching timing generator 15 detects when the light beam spot S has reached the target track based on the value sent from the counter 11 and instructs the switching device 14 to connect the input terminal 141 and the output terminal 143. Thus, the tracking pull of the light beam spot S starts. In the case where the velocity of the light beam spot S at the start of the tracking pull exceeds the maximum velocity at which the light beam spot S can be pulled properly to the target track, the light beam spot S moves beyond the target track to be pulled to a different track. In order to minimize the distance by which the light beam spot S moves excessively, the switching timing generator 15 sends a signal to the amplitude restriction circuit 6 for a certain length of time after the tracking pull of the light beam spot S starts, for instance, for approximately 1 msec. As is shown in waveform (c) of FIG. 5, the amplitude restriction circuit 6 restricts one of a positive amplitude and a negative amplitude of the signal to be sent to the moving device 17 in accordance with the signal from the direction detector 10. Accordingly, when the light beam spot S fails to be pulled to the target track, the signal from the amplitude restriction circuit 6 acts in such a direction as to counteract the movement of the optical head and thus stops the optical head 19. Thus, the extra movement of the optical head 19 is minimized.

With reference to FIGS. 3(a)-3(e), the relationship among an off-track signal from the off-track signal detector 7, a tracking error signal from the tracking error signal detector 4, and signals obtained by the first and second level slicers 8 and 9 will be described. The waveform of FIG. 3(b) illustrates a tracking error signal from the tracking error signal detector 4; the waveform of FIG. 3(d) illustrates an off-track signal from the off-track signal detector 7; the waveform of FIG. 3(c) illustrates a signals obtained by the first level slicer 8 (signal obtained by level-slicing the tracking error signal); and the waveform of FIG. 3(e) illustrates a signal obtained by the second level slicer 9 (signal obtained by level-slicing the off-track signal).

As is shown in the waveform of FIGS. 3(i c) and 3(e) the signal obtained by level-slicing the tracking error signal and the signal obtained by level-slicing the off-track signal are offset in phase to each other by approximately 90 degrees. Either one of the signal obtained by level-slicing the tracking error signal and the signal obtained by level-slicing the off-track signal is ahead of the other depending on the direction in which the light beam spot S moves with respect to the target track. For example, when the light beam spot S crosses the tracks transversely, namely, in the radial direction of the disc 1 toward an outer part of the disc 1, the signal obtained by level-slicing the tracking error signal is behind in terms of phase with respect to the off-track signal by approximately 90 degrees; whereas when the light beam spot S crosses the tracks transversely toward an inner part of the disc 1, the signal obtained by level-slicing the tracking error signal is in advance in terms of phase with respect to the signal obtained by level-slicing the off-track signal by approximately 90 degrees.

Figure 4:
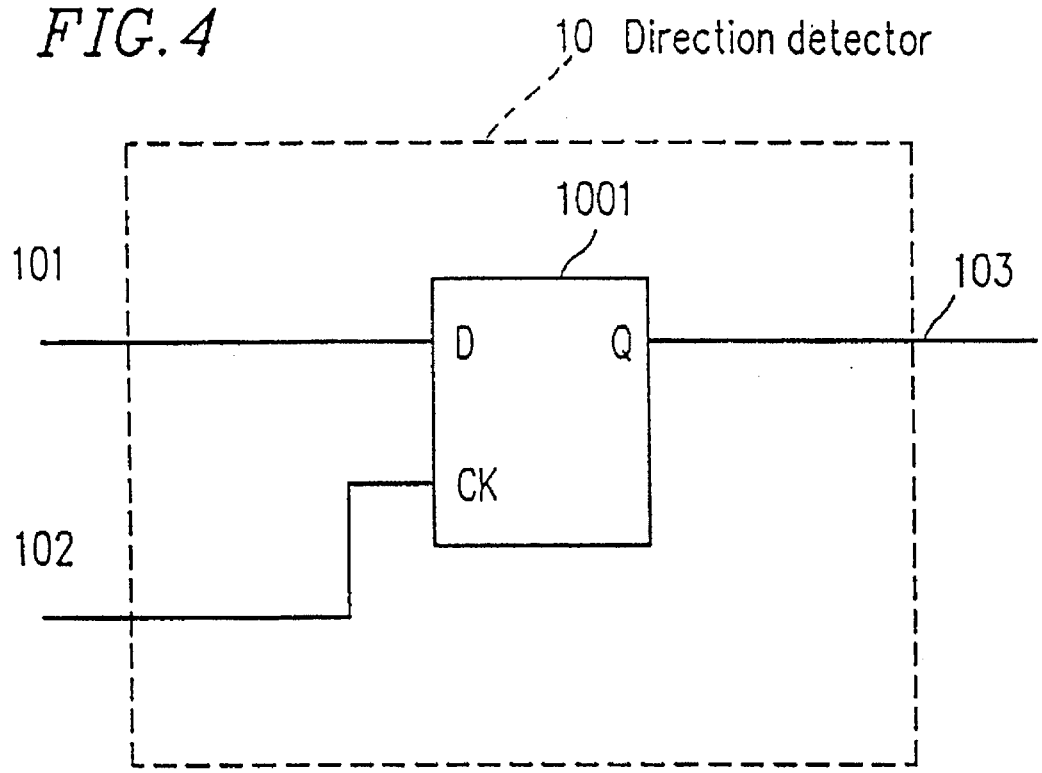
FIG. 4 is a block diagram of a direction detector of the optical information reproduction apparatus shown in FIG. 1.

FIG. 4 shows a structure of the direction detector 10. A D flip-flop 1001 takes in the level of data input D at the rise of a clock input CK. In this example, the data input D receives a signal obtained by level-slicing the tracking error signal, and the clock input CK receives a signal obtained by level-slicing the off-track signal. In such a case, for example, the level of the signal from the D flip-flop 1001 is low when the light beam spot S crosses the tracks transversely toward an outer part of the disc 1 and is high when the light beam spot S crosses the tracks transversely toward an inner part of the disc 1.

FIGS. 5(a)—(c) are an illustration of various waveforms obtained when the track search is performed from an inner part to an outer part of the disc 1. The waveform of FIG. 5(a) shows a direction detection signal from the direction detector 10, and the waveform of FIG. 5(b) illustrates an output from the counter 11, namely, the number of tracks between the track where the light beam spot S is located and the target track. The waveform of FIG. 5(c) illustrates an output from a movement controller 18, namely, an output from the switching device 14.

When the number of tracks between the track where the light beam spot S is located and the target track is N1 or more, the reference velocity signal generator 12 instructs the moving velocity controller 13 to move the moving device 17 at a high speed mode VH, and the moving velocity controller 13 moves the optical head 19 toward the target track while controlling the velocity of the moving device 17 to be VH. When the number of tracks between the track where the light beam spot S is located and the target track is less than N1, the reference velocity signal generator 12 instructs the moving velocity controller 13 to move the moving device 17 at a low speed mode VL which is suitable for tracking pull.

During the track search, the light beam spot S does not necessarily move at a prescribed speed with respect to the target track. The relative speed with respect to the target track often changes in accordance with the eccentricity of the disc, the fluctuation of the tracking actuator or the like. As a result, the light beam spot S moves in the opposite direction away from the target track. In such a case, if simply the signal obtained by level-slicing the tracking error signal is counted, the light beam spot S is counted as approaching the target track. Accordingly, there arises a significant error between the value obtained by the counting and the actual number of tracks to the target track. In order to avoid such an inconvenience, the counter 11 is structured to count the signal obtained by the first level slicer 8 based on the direction signal from the direction detector 10. For example, as is shown in the waveforms 5(a) and 5(b) in FIG. 5, the counter 11 counts to decrease the number of tracks when the direction signal from the direction detector 10 is at a low level, namely, when the light beam spot S approaches the target track. Whereas, the counter 11 counts to increase the number of tracks when the direction signal from the direction detector 10 is at a high level, namely, when the light beam spot S goes farther from the target track. Thus, the number of tracks to the target track is accurately found as is shown in the waveform of FIG. 5(b)

When the value counted by the counter 11 is zero, it is determined that the light beam spot S has reached the target track. The switching timing generator 15 instructs the switching device 14 to connect the input terminal 141 and the output terminal 143 to perform the tracking pull of the light beam spot S. In the case where the light beam spot S starts to be pulled at a velocity higher than the maximum velocity at which the light beam spot S can be pulled properly to the target track, the light beam spot S moves beyond the target track to be pulled to a different track due to the eccentricity of the disc 1, the fluctuation of the actuator, or the like. In order to minimize the distance by which the light beam spot S moves excessively, the amplitude restriction circuit 6 restricts one of a positive amplitude and a negative amplitude of the signal to be sent to the moving device 17 in accordance with the signal from the direction detector 10, as is shown in the waveform FIG. 5(c). Accordingly, when the light beam spot S fails to be pulled to the target track, the signal from the amplitude restriction circuit 6 acts in such a direction as to counteract the movement of the optical head and thus stops the optical head 19. Thus, the extra movement of the optical head 19 is minimized.

Figure 6:
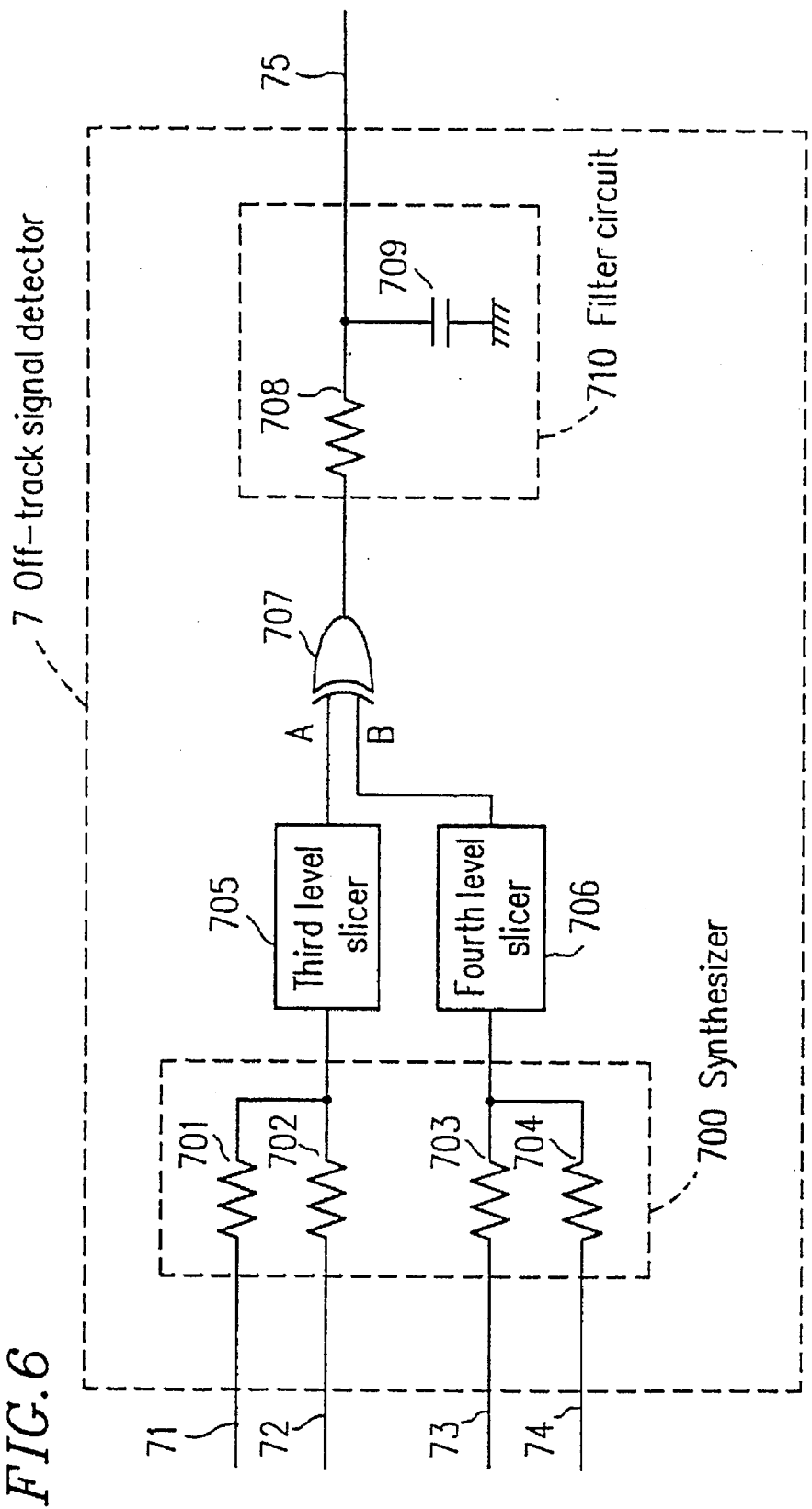
FIG. 6 is a block diagram of an off-track signal detector in the optical information reproduction apparatus shown in FIG. 1.

FIG. 6 shows a structure of the off-track signal detector 7. The four signals sent from the four-divided photodetector 3 are input to the input terminals 71 through 74 are further sent to a synthesizer 700 including four resistors 701, 702, 703 and 704. From the synthesizer 700, two signals (A+B) and (C+D) are output. The signal (A+B) is obtained by adding signals generated by two of the four detecting areas of the photodetector 3, and the signal (C+D) is obtained by adding signals generated by another two detecting areas. As is illustrated in FIG. 2, areas A and B are diagonal to each other, and areas C and D are diagonal to each other. These two signals (A+B) and (C+D) are converted into signals having a high level and a low level by a third level slicer 705 and a fourth level slicer 706, respectively. The resultant signals are sent to an exclusive OR circuit 707 as inputs A and B. The exclusive OR circuit 707 outputs a signal corresponding to an exclusive OR of the two inputs A and B, and the resultant signal is sent to the output terminal 75 of a filter circuit 710 including a resistor 708 and a capacitor 709.

Figure 7:
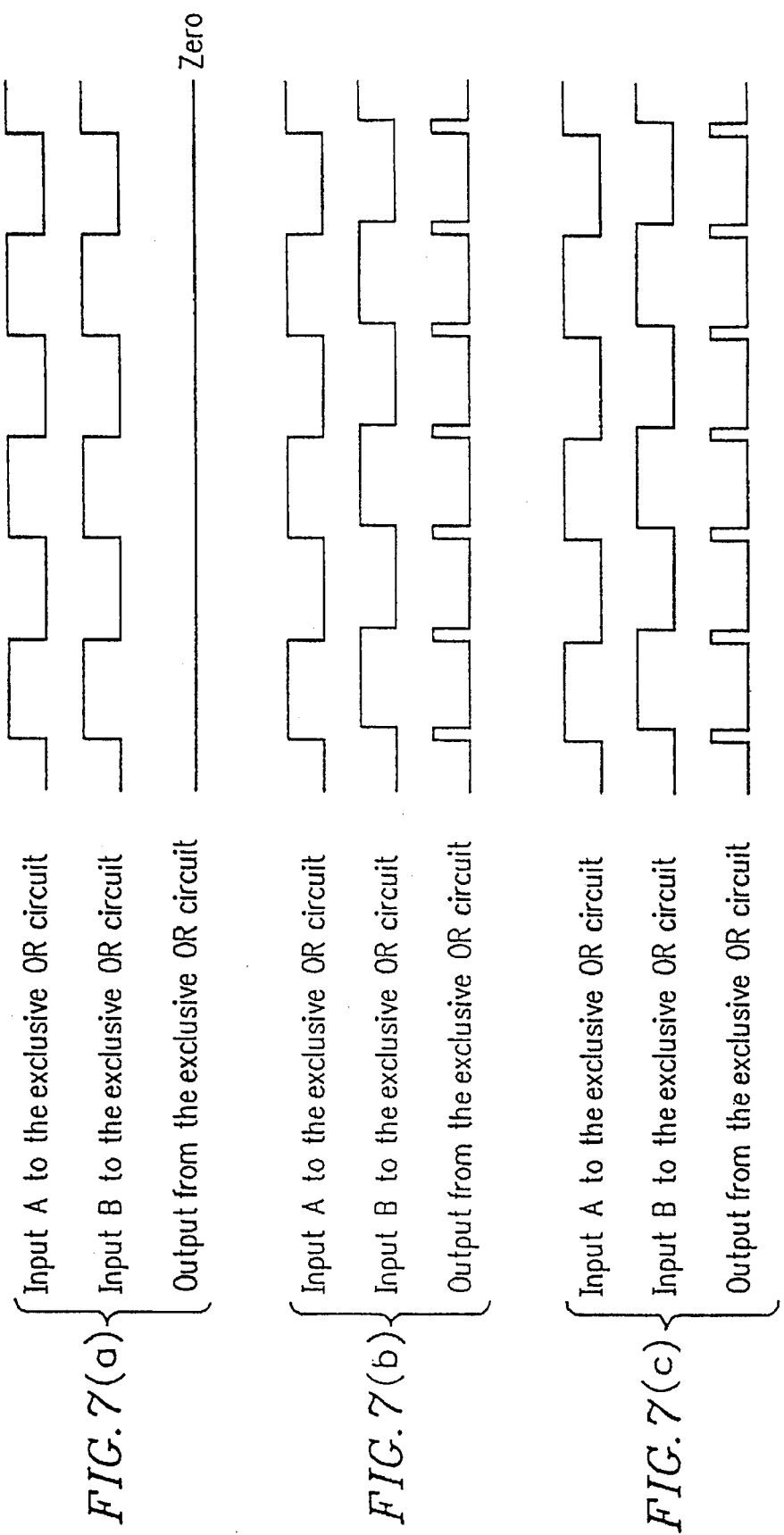
FIGS. 7(a)–7(c) are illustrations of waveforms used in the off-track signal detector shown in FIG. 6.

FIG. 7 shows the relationship between the two inputs and an output of the exclusive OR circuit 707. The waveform set of FIG. 7(a) shows such relationship when the light beam spot S is at the center of the track. The inputs A and B have substantially the same waveforms. Accordingly, the output from the exclusive OR circuit 707 is approximately zero. The waveform set of FIG. 7(c) shows such relationship when the light beam spot S is outside the center of the track on the disc 1. The output from the exclusive OR circuit 707 has pulses corresponding to the phase offset between the inputs A and B. The waveform set of FIG. 7(b) shows the above-mentioned relationship when the light beam spot S is inside the center of the track on the disc 1. The output from the exclusive OR circuit 707 again have pulses corresponding to the phase offset between the inputs A and B. By sending the output shown either in waveform set of FIG. 7(b) or FIG. 7(c) through a lowpass filter, an off-track signal as shown in the waveform of FIG. 3(d) can be obtained.

Figure 10:
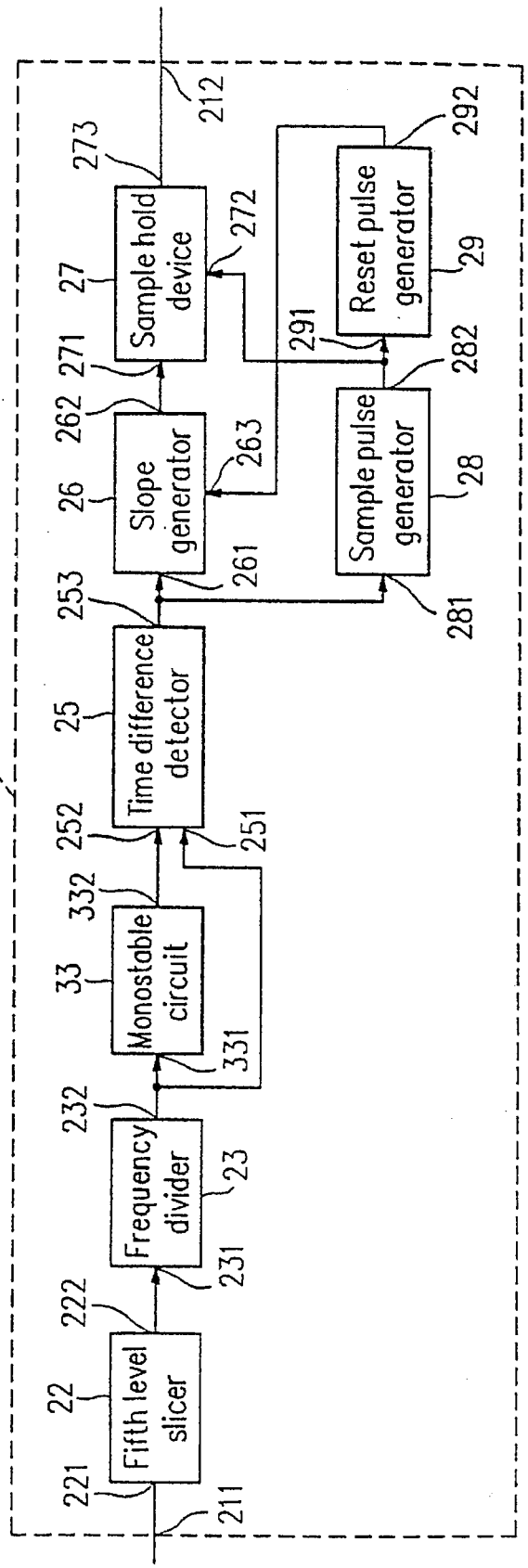
FIG. 10 is a block diagram of a rotation rate controller of the optical information reproduction apparatus shown in FIG. 1.
Figure 11:
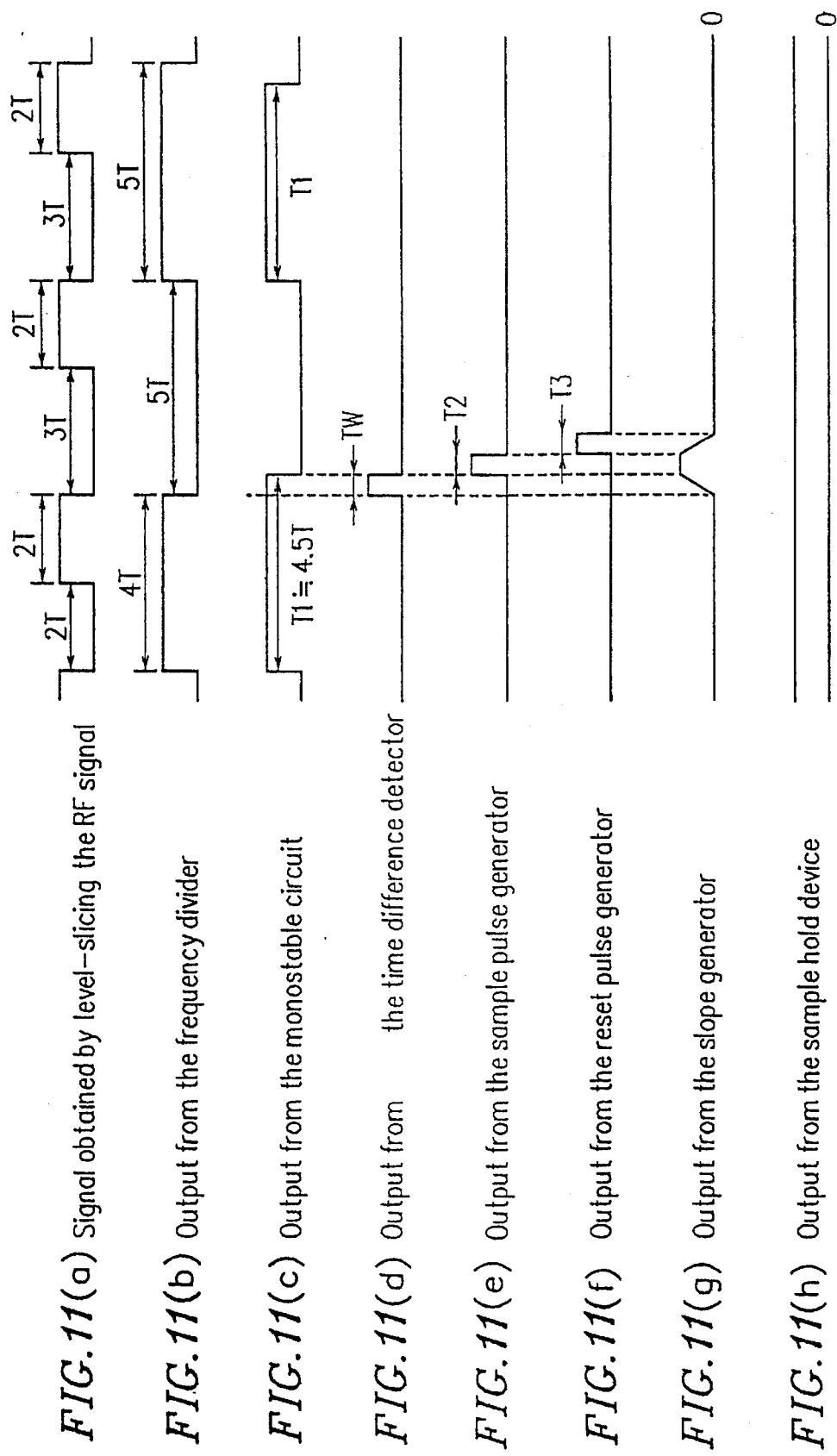
FIGS. 11(a)–11(h) are illustrations of waveforms used in the rotation rate controller shown in FIG. 10.

Hereinafter, the rotation rate controller 21 shown in FIG. 1 will be described in detail with reference to FIGS. 10 and 11. FIG. 10 shows a structure of the rotation rate controller 21, and FIG. 11 shows waveforms of various signals.

As is shown in the waveform of FIG. 11(a), an RF signal input to an input terminal 211 of the rotation rate controller 21 is converted into a signal having a high level and a low level by the fifth level slicer 22, and the frequency of the resultant signal is divided into two by a frequency divider 23. For example, where a cycle of a basic clock required for data reproduction is T, the shortest signal cycle is 2T and the longest signal cycle is 8T in a (1, 7) modulator system. Thus, the period from a rise to a fall of the shortest signal among the outputs from the frequency divider 23 is 4T as is shown in the waveform of FIG. 11(b). The signal output from an output terminal 232 of the frequency divider 23 is sent to an input terminal 331 of a monostable circuit 33 and also to an input terminal 251 of a time difference detector 25. The time difference detector 25 has another input terminal 252. The monostable circuit 33 outputs a signal having a prescribed pulse width T1 shown in the waveform of FIG. 11(c) from an output terminal 332 thereof. The signal is sent to the input terminal 252 of the time difference detector 25. The time difference detector 25 outputs, from an output terminal 253 thereof, a signal having a pulse as shown in the waveform of FIG. 11(d) which is high during period TW, namely, from the fall of the output from the frequency divider 23 to the fall of the output from the monostable circuit 33. The signal from the time difference detector 25 is sent to an input terminal 261 of a slope generator 26 and an input terminal 281 of a sample pulse generator 28. The sample pulse generator 28 outputs, from an output terminal 282 thereof, a signal having a pulse shown in the waveform of FIG. 11(e) which has a width of T2 in synchronization with the fall of the output from the time difference detector 25. The signal from the sample pulse generator 28 is sent to a sample hold control input terminal 272 of a sample hold device 27 and also to an input terminal 291 of a reset pulse generator 29. The reset pulse generator 29 outputs, from an output terminal 292 thereof, a signal having a pulse shown in the waveform of FIG. 11(f) which has a width of T3 in synchronization with the fall of the output from the sample pulse generator 28. The signal from the reset pulse generator 29 is sent to a reset input terminal 263 of the slope generator 26. As is shown in the waveform of FIG. 11(g), the slope generator 26 increases the level of an output therefrom in accordance with time while the output from the time difference detector 25 is at a high level, and then stops increase of the output therefrom when the output from the time difference detector 25 falls. The sample hold device 27 samples and holds the value of the signal from an output terminal 262 of the slope generator 26 in response to the output from the sample pulse generator 28. Accordingly, a signal shown in the waveform of FIG. 11(h) is sent to an output terminal 273 of the sample hold device 27. Then, a reset pulse is sent out from the output terminal 292 of the reset pulse generator 29, and the output from the slope generator 26 is reset to zero by the reset pulse.

In the case where the period between the rise and the fall of the output from the frequency divider 23 is longer than 4T, for example, in the case where the cycle is 5T, the rotation rate controller 21 operates in the following manner.

The pulse width of the output from the monostable circuit 33 is set to be approximately 4.5T. When the output from the frequency divider 23 has a pulse width more than 4.5T, the output from the time difference detector 25 has no pulse as is shown in the waveform of FIG. 11(d). Accordingly, the sample hold device 27 performs a sampling and holding operation only when the output from the frequency divider 23 has a shortest pulse width of 4T.

The signal from the output terminal 273 of the sample hold device 27, namely, the signal from an output terminal 212 of the rotation rate controller 21 is sent to a control input terminal 2001 (FIG. 1) of the motor 2. When the rotation rate of the motor 2 becomes lower than a prescribed rate, the shortest cycle of the RF signal becomes longer and the pulse width TW of the output from the time difference detector 25 becomes narrower. As a result, the level of the output from the sample hold device 27 is reduced. Thus, the motor 2 is controlled to raise the rotation rate. When the rotation rate of the motor 2 becomes higher than the prescribed rate, the shortest cycle of the RF signal becomes shorter and the pulse width TW of the output from the time difference detector 25 becomes wider. As a result, the level of the output from the sample hold device 27 is raised. Thus, the motor 2 is controlled to lower the rotation rate. In this manner, the rotation rate of the motor 2 is controlled so as to maintain the shortest cycle of the RF signal at a prescribed value.

By the rotation rate controller 21 illustrated in FIG. 10, the shortest cycle of the RF signal can be detected to control the rotation rate of the motor 2, whether tracking control is performed or the light beam spot S crosses the tracks transversely during the track search. However, the rotation precision is sometimes deteriorated since the pulse width of the output from the monostable circuit 33 changes in accordance with temperature or the like. Rotation rate control of the motor 2 for preventing such deterioration will be described with reference to FIG. 12. Identical elements as those in FIG. 10 bear the identical reference numerals and description thereof will be omitted.

Figure 12:
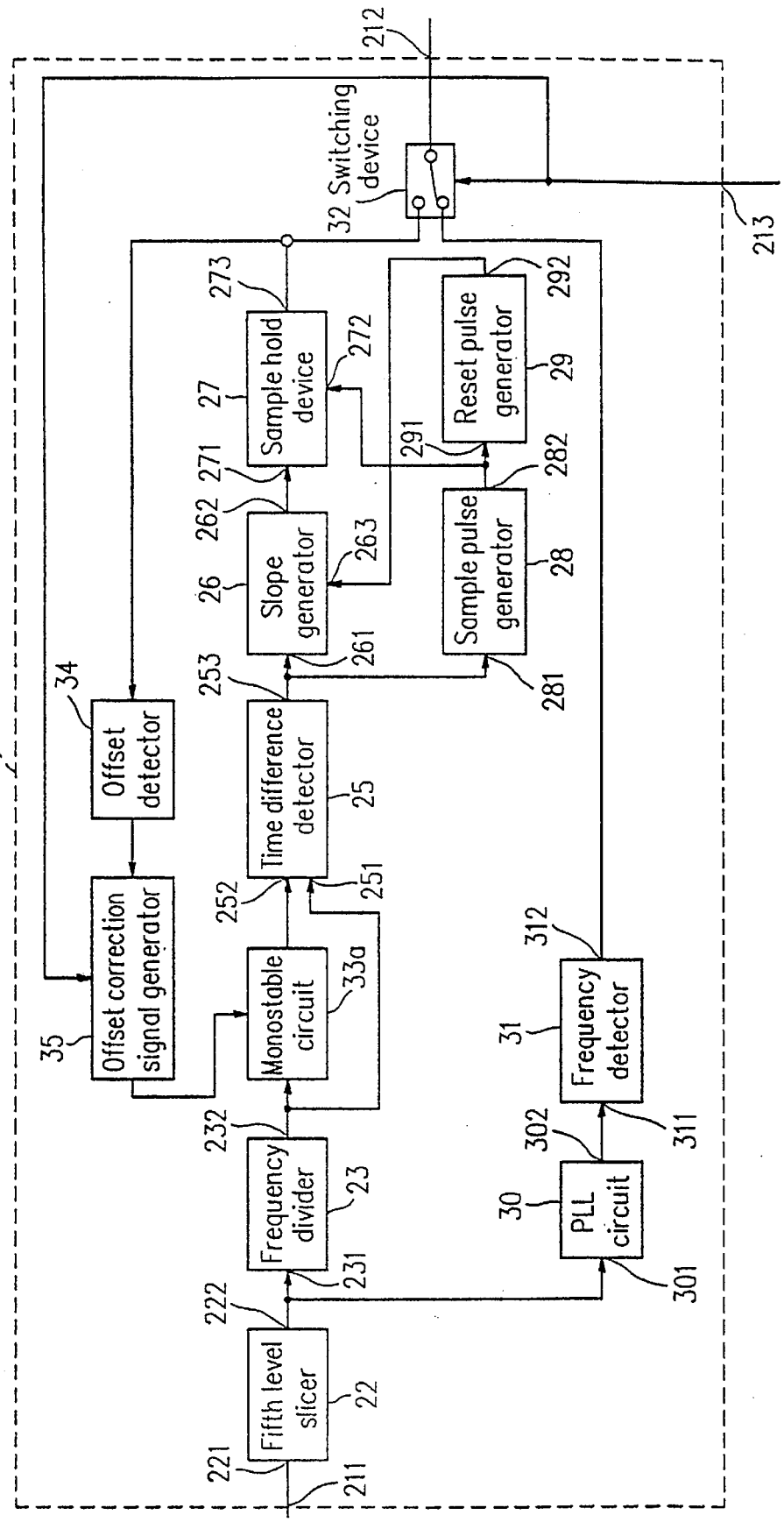
FIG. 12 is a block diagram of a rotation rate controller in another example according to the present invention.

FIG. 12 is a block diagram of a rotation rate controller 21a. In the rotation rate controller 21a, a clock signal in synchronization with an RF signal is generated in a PLL (phase locked loop) circuit during the tracking control, and the motor 2 is controlled so as to maintain the frequency of the PLL circuit at a prescribed value. In detail, the rotation rate controller 21a operates in the following manner.

A clock signal in synchronization with the output from the fifth level slicer 22 is generated in a PLL circuit 30, and the frequency of the signal from the PLL circuit 30 is detected by a frequency detector 31. The signal from the frequency detector 31 is sent to the motor 2 via a switching device 32 to control the motor 2 so as to maintain the frequency of the output from the PLL circuit 30 at a prescribed level. The switching operation of the switching device 32 is performed by a tracking control ON/OFF signal, for example, a signal from an output terminal 152 of the switching timing generator 15 (FIG. 1). Alternatively, the switching operation can be controlled by a detection signal indicating that the tracking control is performed stably. In the state where the rotation rate of the motor 2 is controlled in this manner, the pulse width of the output from a monostable circuit 33a is corrected.

The correction of the output from the monostable circuit 33a is performed in the following manner.

The output from the sample hold device 27 is sent to an offset detector 34. The offset detector 34 compares the value of the output from the sample hold device 27 and a prescribed reference value and detects an offset amount of a prescribed pulse width of the monostable circuit 33a with respect to the current pulse width based on the difference between the two values. The offset detector 34 then sends a signal corresponding to the offset amount to an offset correction signal generator 35. The pulse width of the output from the monostable circuit 33a is controlled to be the prescribed value in response to the output from the offset correction signal generator 35. When the tracking control is stopped for the track search or the like, the offset correction signal generator 35 holds the value of the signal to be sent to the monostable circuit 33a in response to the tracking ON/OFF signal. Accordingly, the monostable circuit 33a keeps outputting a signal having a pulse width which is obtained immediately before the tracking control is stopped.

The time difference detector 25 compares the pulse of the signal from the monostable circuit 33a and the pulse of the signal from the frequency divider 23, and outputs a signal through an output terminal 253 thereof which is high during the period TW, namely, from the fall of the output from the frequency divider 23 to the fall of the output from the monostable circuit 33a. As in the rotation rate controller 21 shown in FIG. 10, a signal corresponding to the time difference between the signals detected by the time difference detector 25 is generated by the sample hold device 27, and such a signal is sent to the motor 2 via the switching device 32.

As is described above, in the rotation rate controller 21a shown in FIG. 12, the pulse width of the output from the monostable circuit 33a is controlled to be the prescribed width while the tracking control is performed. Therefore, a change in the pulse width of the output from the monostable circuit 33a in accordance with the temperature can be compensated for, thus realizing more precise control of the rotation rate of the motor 2.

Figure 8:
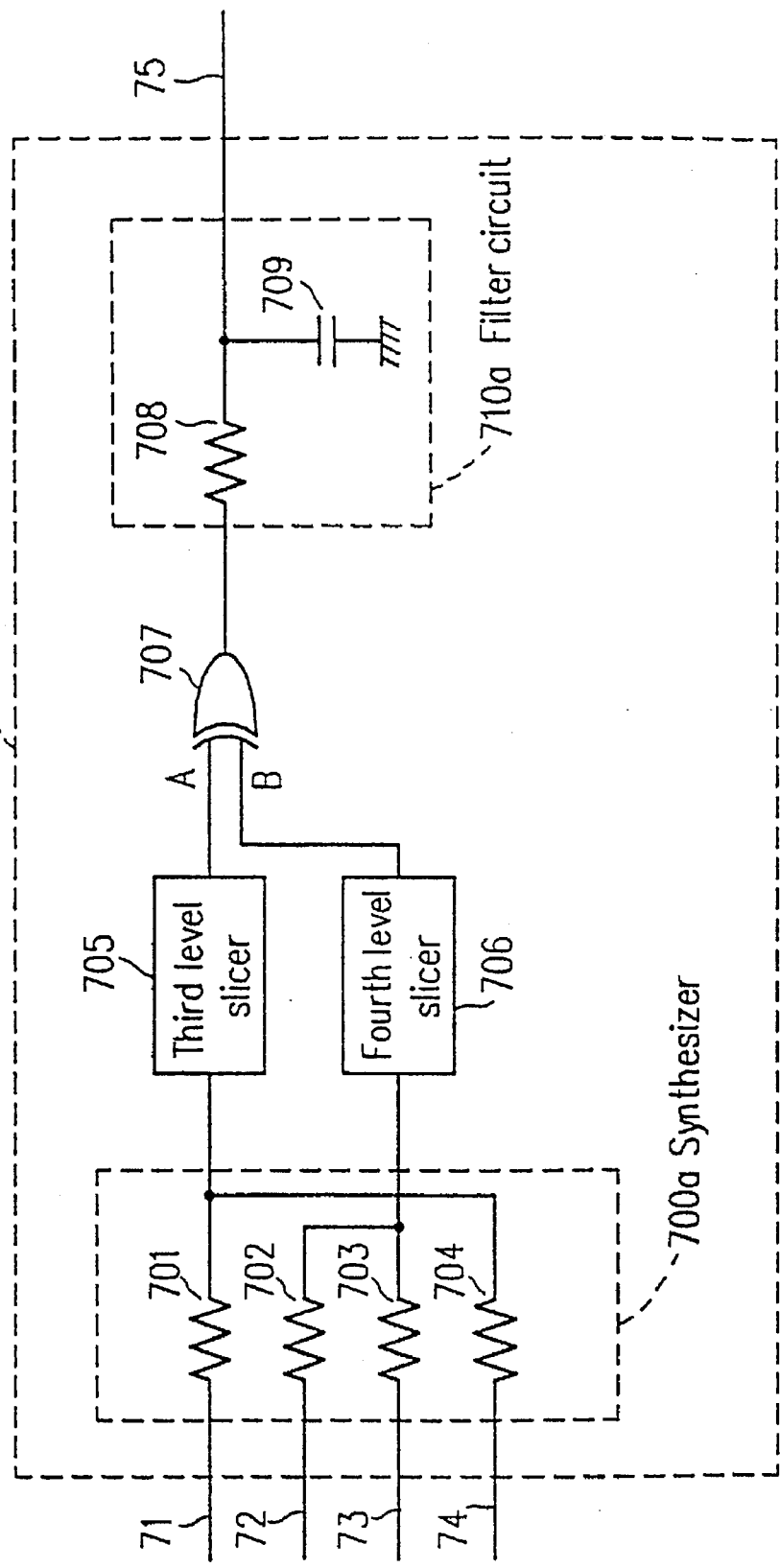
FIG. 8 is a block diagram of an off-track signal detector in another example according to the present invention.

Instead of the off-track signal detector 7 shown in FIG. 6, an off-track signal detector 7a shown in FIG. 8 can be used. The off-track signal detector 7a operates in the following manner.

Four signal input to the input signals 71 through 74 are further sent to a synthesizer 700a including four resistors 701 through 704. The synthesizer 700a sends two signals (A+D) and (B+C) each corresponding to the sum of two adjacent detecting areas of the four-divided photodetector 3 (FIG. 2). The signal (A+D) is sent to the third level slicer 705, and the signal (B+C) is sent to the fourth level slicer 706. The level slicers 705 and 706 respectively level-slice the signals and send the resultant signals to the exclusive OR circuit 707 as inputs A and B. The exclusive OR circuit 707 outputs a signal corresponding to an exclusive OR of the two inputs A and B, and the resultant signal is sent to the output terminal 75 of the filter circuit 710a including the resistor 708 and the capacitor 709.

Figure 9A:
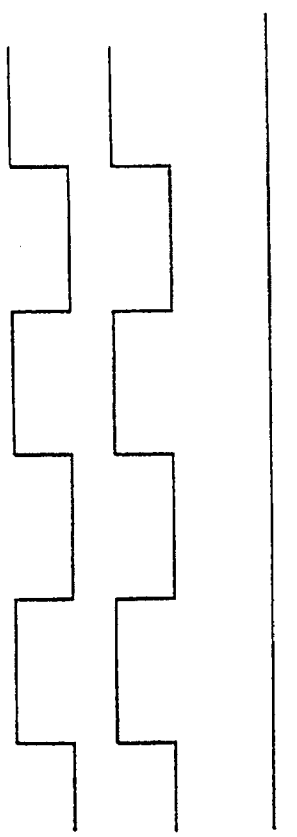
FIGS. 9(a)–9(b) are illustrations of waveforms used in the off-track signal detector shown in FIG. 8.
Figure 9B:
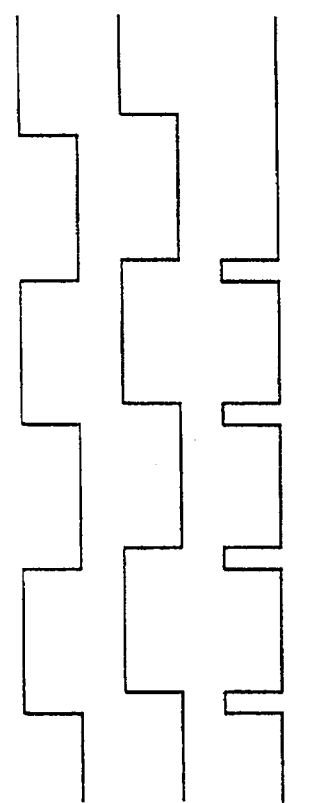

FIG. 9(a) and 9(b) show the relationship between the two inputs A and B to and an output from the exclusive OR circuit 707 of the off-track signal detector 7a. The waveform set of FIG. 9(a) shows such relationship when the light beam spot S is at the center of the track. Since crosstalk from an adjacent track is very little, the inputs A and B have substantially the same waveforms. Accordingly, the output from the exclusive OR circuit 707 is approximately zero. The waveform of FIG. 9(b) shows such relationship when the light beam spot S is outside or inside the center of the track on the disc 1. The output from the exclusive OR circuit 707 has pulses corresponding to the phase offset between the inputs A and B caused due to crosstalk from an adjacent track. The offset amount is maximum when the light beam spot S is at a median position between the center of one track and the center of the adjacent track. By sending the output shown in the waveform set of FIG. 9(b) through a lowpass filter, an off-track signal as shown in the waveform of FIG. 3(d) can be obtained.

The off-track signal detector 7 shown in FIG. 6 and the off-track signal detector 7a shown in FIG. 8 will hereinafter be compared.

The off-track signal detector 7 is suitable to a disc having deep pits, and the off-track signal detector 7a is suitable to a disc having shallow pits. For example, the off-track signal detector 7 is optimum when the optical depth and of the pits is $\lambda/4$ and is appropriate for the optical depth and in the range from $\lambda/8$ to $3\lambda/8$. The off-track signal detector 7a is optimum when the optical depth and of the pits is $\lambda/8$ and is appropriate for the optical depth and in the range from $\lambda/10$ to $\lambda/6$. Letter n is a refractive index of the optical disc, d is the depth of the pits, and $\lambda$ is a wavelength of the light beam.

The method and structure described above can be modified in various ways.

For example, in FIG. 1, the velocity measurement circuit 41 can be eliminated. In such a case, the output from the reference velocity signal generator 12 is sent to the moving device 17 through the moving velocity controller 13 and the switching device 14 to drive the moving device 17. The moving velocity of the optical head 19 is controlled relatively roughly using a counter voltage generated by the moving device 17.

The offset of the track can also be detected by a method such as a three-beam method or a push-pull method. Needless to say, the direction in which the light beam moves can be detected from the off-track signal obtained by such a method and the output from the exclusive OR circuit 707.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical information reproduction apparatus for reproducing information from a disc having a plurality of tracks storing the information in the form of pits, the apparatus comprising:

radiation means for radiating a light beam toward the disc to form a light spot on the disc;

moving means for moving the radiation means to move the light spot in a direction crossing the plurality of tracks in a radial direction of the disc;

light detection means having a detecting plane for receiving the light beam reflected by the disc, the detecting plane being divided into four detection areas at least in a direction parallel to a tangent of the tracks and in a direction perpendicular to the tangent of the tracks, the four detection areas generating light intensity signals corresponding to the intensities of the light beam which is received;

positional offset detection means for detecting a positional offset of the light spot with respect to one of the tracks based on the light intensity signals generated by the light detection means and outputting the detection result as a positional offset signal;

signal processing means for performing processing of the light intensity signals including logic operation to obtain an operation signal; and direction detection means for detecting a direction in which the light spot moves with respect to a target track based on the positional offset signal and the operation signal during the movement of the light spot toward the target track, wherein the operation signal is an exclusive OR of signals obtained by adding the light intensity signals together generated by two sets of detection areas of the light detection means the two sets of detection areas each including two detection areas diagonally positioned to each other.

2. An apparatus according to claim 1, further comprising:

counting means for counting the number of tracks which have been crossed by the light spot during the movement of the light spot crossing the plurality of tracks in the radial direction of the disc, based on the detection result obtained by the direction detection means; and control means for controlling the movement of the light spot by providing a driving signal to the moving means based on the number of tracks counted by the counting means during the movement of the radiation means for track search to locate the light spot on the target track.

3. An apparatus according to claim 2, further comprising switching means for performing switching between tracking control for moving the light spot to be located on the target track and track search, wherein the control means includes means for restricting an amplitude of the driving signal to be provided to the moving means during a prescribed period after the switching is performed and thus minimizing the distance between the light spot and the target track.

4. An apparatus according to claim 1, wherein the operation means includes waveform shaping means for performing waveform shaping of the light intensity signals prior to the processing including the logic operation.

5. An apparatus according to claim 4, wherein the signal processing means includes a lowpass filter for attenuating a high frequency component of the operation signal, and the direction detection means uses the operation signal after the high frequency component thereof is attenuated.

6. An apparatus according to claim 5, wherein the direction detection means converts each of the operation signals with the high frequency component thereof attenuated and the positional offset signal into a signal having a high level and a low level and detects a direction in which the light spot moves with respect to the target track based on a phase difference between signals obtained by level-slicing the operation signal and the signal obtained by level-slicing the positional offset signal.

7. An optical information reproduction apparatus for reproducing information from a disc having a plurality of tracks storing the information in the form of pits, the apparatus comprising:

radiation means for radiating a light beam toward the disc to form a light spot on the disc;

moving means for moving the radiation means to move the light spot in a direction crossing the plurality of tracks in a radial direction of the disc;

light detection means having a detecting plane for receiving the light beam reflected by the disc, the detecting plane being divided into two detection areas in a direction parallel to a tangent of the tracks, the two detection areas generating light intensity signals corresponding to the intensities of the light beam which is received;

positional offset detection means for detecting a positional offset of the light spot with respect to one of the tracks based on the light intensity signals generated by the light detection means and outputting the detection result as a positional offset signal;

signal processing means for performing processing of the light intensity signals including logic operation to obtain an operation signal; and direction detection means for detecting a direction in which the light spot moves with respect to a target track based on the positional offset signal and the operation signal during the movement of the light spot toward the target track.

wherein the operation signal is an exclusive OR of light intensity signals generated by the two detection areas of the light detection means.

8. An apparatus according to claim 7, further comprising:

counting means for counting the number of tracks which have been crossed by the light spot in the radial direction during the movement of the light spot crossing the plurality of tracks in the radial direction of the disc, based on the detection result obtained by the direction detection means; and control means for controlling the movement of the light spot by providing a driving signal to the moving means based on the number of tracks counted by the counting means during the movement of the radiation means for track search to locate the light spot on the target track.

9. An apparatus according to claim 8, further comprising switching means for performing switching between tracking control for moving the light spot to be located on the target track and track search, wherein the control means includes means for restricting an amplitude of the driving signal to be provided to the moving means during a prescribed period after the switching is performed and thus minimizing the distance between the light spot and the target track.

10. An apparatus according to claim 7, wherein the operation means includes waveform shaping means for performing waveform shaping of the light intensity signals prior to the processing including the logic operation.

11. An apparatus according to claim 10, wherein the signal processing means includes a lowpass filter for attenuating a high frequency component of the operation signal, and the direction detection means uses the operation signal after the high frequency component thereof is attenuated.

12. An apparatus according to claim 11, wherein the direction detection means converts each of the operation signal with the high frequency component thereof attenuated and the positional offset signal into a signal having a high level and a low level and detects a direction in which the light spot moves with respect to the target track based on a phase difference between signals obtained by level-slicing the operation signal and the signal obtained by level-slicing the positional offset signal.

13. A method for moving a light spot formed by radiating a light beam toward a disc having a plurality of tracks having information in the form of pits, the light spot being moved in a direction crossing the plurality of track in a radial direction of the disc, the method comprising the steps of:

receiving the light beam reflected by the disc by detection means having a plurality of detection areas to generate light intensity signals corresponding to the intensities of the light beam received by the respective detection areas;

detecting a positional offset of the light spot with respect to one of the tracks based on the signals and outputting the detection result as a positional offset signal;

performing processing of the light intensity signals including logic operation for obtaining an exclusive OR and outputting the operation result as an operation signal; and performing waveform shaping of the positional offset signal and the operation signal to detect a direction in which the light spot moves based on a phase difference between the positional offset signal with the waveform thereof shaped and the operation signal with the waveform thereof shaped, and thus generating a direction signal indicating the detected direction.

14. A method according to claim 13, wherein the step of performing waveform shaping and generating the direction signal includes the step of converting each of the positional offsets signal and the operation signal into a signal having a high level and a low level and detecting the direction in which the light spot moves based on the phase difference between the signals obtained by level-slicing the operation signal and the signal obtained by level-slicing the positional offset signal.

15. A method according to claim 14, further comprising the steps of:

counting the number of tracks which have been crossed by the light spot in the radial direction of the disc based on the positional offset signal and the direction signal; and controlling radiation means for radiating a light beam to the disc based on the number of tracks obtained by the counting and moving the light spot to locate the light spot on a target track among the plurality of tracks.

16. A method according to claim 15, further comprising the steps of:

controlling the radiation means based on the positional offset signal to locate the light spot on the target track;

performing switching between tracking control and track search; and restricting an amplitude of a driving signal to be provided to the radiation means for a prescribed period after the track search is switched to the tracking control.

* * * * *